(12) United States Patent
Desmarais et al.

(10) Patent No.: US 6,712,405 B2
(45) Date of Patent: Mar. 30, 2004

(54) LATCH MECHANISM FOR A SNOWMOBILE ENGINE COVER

(75) Inventors: Jean-François Desmarais, Racine (CA); Philip Godfrey, St-Elie d'Orford (CA)

(73) Assignee: Bombardier Recreational Products Inc., Saint-Bruno (CA)

( * ) Notice: Subject to any disclaimer, the term of this patent is extended or adjusted under 35 U.S.C. 154(b) by 0 days.

(21) Appl. No.: 09/986,158

(22) Filed: Nov. 7, 2001

(65) Prior Publication Data

US 2002/0053804 A1 May 9, 2002

Related U.S. Application Data

(60) Provisional application No. 60/246,096, filed on Nov. 7, 2000.

(51) Int. Cl.[7] .................................................. E05C 19/12
(52) U.S. Cl. .............................. 292/113; 29/DIG. 50; 29/DIG. 42; 29/DIG. 31; 29/DIG. 49; 29/246; 24/458
(58) Field of Search ............................... 24/714, 714 D, 24/705 K, 458; 403/321, 322.1, 322.4, 325, 374.1, 374.2, 375.5; 180/69.2, 182, 190; 114/55.53, 55.51, 201 R; 292/246, 250, DIG. 50, DIG. 42, DIG. 31, DIG. 49, 113, 247, 299; 296/225, 100.01, 106

(56) References Cited

U.S. PATENT DOCUMENTS

| | | | | |
|---|---|---|---|---|
| 1,955,020 A | * | 4/1934 | Reynolds | 54/21 |
| 2,440,734 A | * | 5/1948 | Burke | 292/226 |
| 2,459,666 A | * | 1/1949 | Marus | 292/246 |
| 3,146,011 A | * | 8/1964 | Seevers | 292/247 |
| 3,295,177 A | * | 1/1967 | Bruckl | 24/70 R |
| 3,572,813 A | * | 3/1971 | Takada | 296/196 |
| 3,618,995 A | * | 11/1971 | McLean | 292/66 |
| 4,025,094 A | * | 5/1977 | Mitchell | 292/87 |
| 4,090,278 A | * | 5/1978 | Olivieri | 24/70 SK |
| 4,111,476 A | * | 9/1978 | Jacobs | 292/246 |
| 4,218,081 A | * | 8/1980 | Johnson | 292/66 |
| 4,230,351 A | * | 10/1980 | Bisbing | 292/223 |
| 4,243,255 A | * | 1/1981 | Hornak | 292/113 |
| 4,458,912 A | * | 7/1984 | Bertonneau | 280/603 |
| 5,333,363 A | * | 8/1994 | Artusi et al. | 24/68 SK |
| 5,461,892 A | * | 10/1995 | Hsieh | 70/73 |
| 5,592,722 A | * | 1/1997 | Foscaro et al. | 24/68 SK |
| 5,619,950 A | * | 4/1997 | Ikeda | 114/363 |
| 5,624,142 A | * | 4/1997 | Watson et al. | 292/241 |
| 5,638,709 A | * | 6/1997 | Clavin | 70/208 |
| 5,884,370 A | * | 3/1999 | Bergamin | 24/71 SK |
| 6,041,721 A | * | 3/2000 | Weston | 108/65 |
| 6,145,168 A | * | 11/2000 | Baggio et al. | 24/70 SK |
| 6,179,350 B1 | * | 1/2001 | Ely et al. | 292/113 |

* cited by examiner

Primary Examiner—Robert J. Sandy
Assistant Examiner—Dinesh N Melwani
(74) Attorney, Agent, or Firm—BRP Legal Services Steward Strickland

(57) ABSTRACT

A latch mechanism for a vehicle, e.g., a snowmobile, includes a latch and a base. The latch is resiliently coupled to the base using a resilient member, for example, a ring-shaped member. The latch is movable, e.g., pivotable, between first and second stable positions. In the first stable position, the latch can be inserted through an aperture in the base, and in the second stable position, the latch can be moved or pivoted to secure the base with respect to the latch. The base may be attached to a cover member for an engine compartment of the vehicle. In the second stable position, a tab of the latch engages against a first engageable surface of the base, and portion of the latch opposite the tab includes a second engagement surface that cooperates with a second engageable surface provided on the base.

26 Claims, 24 Drawing Sheets

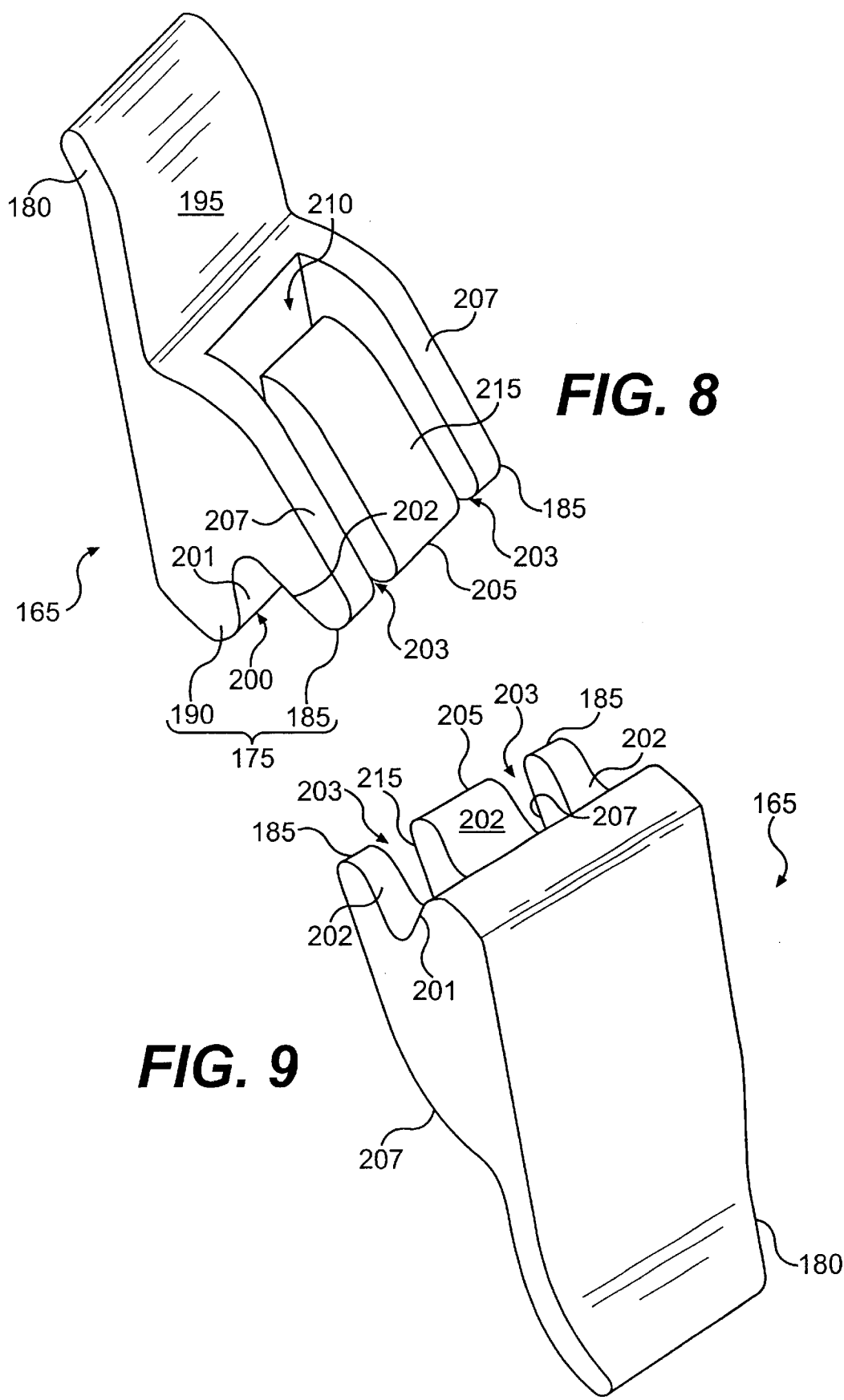

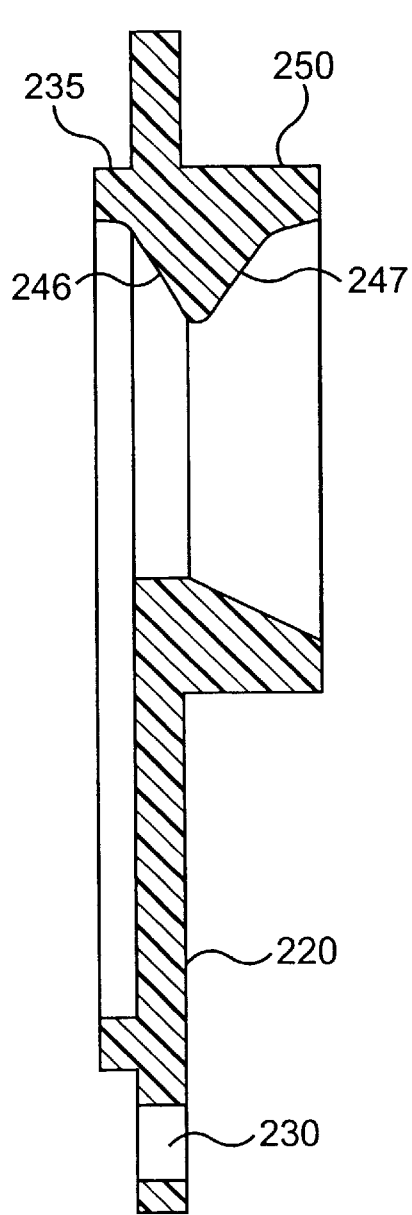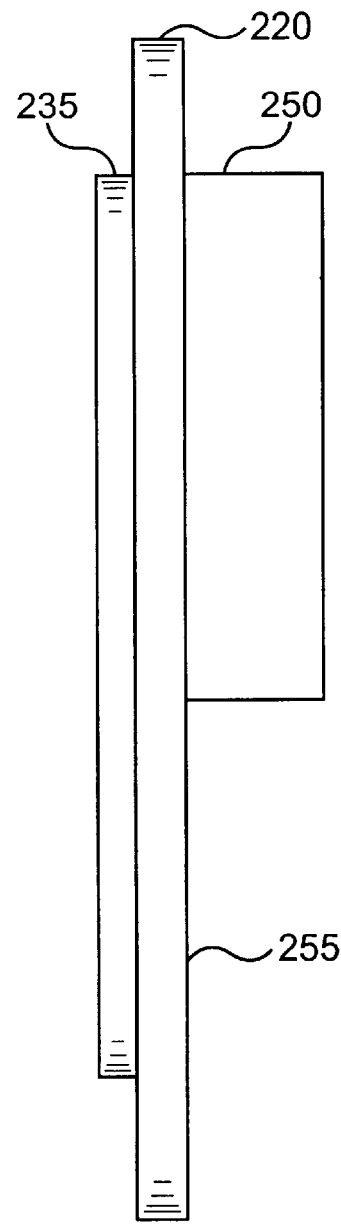
FIG. 16    FIG. 17

LATCH MECHANISM FOR A SNOWMOBILE ENGINE COVER

CROSS-REFERENCE

This application relies for priority on U.S. Provisional patent application Ser. No. 60/246,096, filed on Nov. 7, 2000.

BACKGROUND OF THE INVENTION

1. Field of the Invention

This invention relates to a latch mechanism, and more particularly to a latch mechanism for use with a vehicle, such as a snowmobile.

2. Description of Related Art

FIG. 1 is a side view of a prior art snowmobile 10. The snowmobile 10 includes a main body 15 that is supported by a frame. A rear portion of the main body 15 includes a seat 20 and a front portion of the main body includes an engine cover 25. The engine cover can be removed or pivoted to a raised position (FIG. 2) to allow access to the engine and/or other interior compartments of the snowmobile 10. Various prior art latching mechanisms have been used to secure the cover 25 with respect to the main body 15.

As shown in FIG. 3, which is a partial rear perspective view of the snowmobile 10, such a latching mechanism 30 may include an elastic member 35. The elastic member 35 in FIG. 3 is shown as being anchored or secured to the main body 15 of the snowmobile 10 using a fastener 40. The elastic member 35 includes an opening 45 that is intended to receive and cooperate with a hook 50 provided on the cover 25. To secure the cover 25 to the main body 15 using the latching mechanism 30, the elastic member 35 is stretched until the opening 45 overcomes the hook 50, and the elastic member 35 is released such that the hook 50 is coupled to the elastic member 35, preferably under a predetermined tension.

FIGS. 4 and 5 show an alternative prior art latching mechanism. FIG. 4 shows a lever 55 that is pivotably connected to the main body 15 of the snowmobile 10. The cover 25 includes a receptacle 60 with a slot 65 that is sized to receive the lever 55. A square protrusion 70 on the lever 55 fits within the slot 65 when the lever 55 is pivoted into the locking position, as shown in FIG. 5. The lever 55 can be pivoted using a knob 75.

FIGS. 6A–7 show yet another prior art latch mechanism. The latch mechanism includes a latch 76 (FIG. 6A) provided on cover 77 that can be used to releasably connect the cover 77 to a hook 78 (FIG. 6B) provided on a main body 79 of the snowmobile. The latch 76 is pivotably mounted on a support bracket 80, which is mounted to a base 81 connected to the cover 77. The latch 76 is shown in the open position in FIG. 6A, with a pair of arms 82 extending away from the latch 76. The arms 81 include springs and are connected by a cross member 83.

When the cover 77 is closed, the cross member 83 is coupled to the hook 78 on the main body 79 (FIG. 6B). After reaching this position, the latch 76 is pivoted downwardly toward the base 81, such that the cover 77 and main body 79 are secured to one another. This secured position is shown in FIG. 7. A pair of upstanding flanges 84 are aligned with the tab portion of the latch 76. The flanges 84 include through holes 85 that can accommodate a locking pin (not shown) to maintain the latch 76 in the closed position shown in FIG. 7.

These prior at latch mechanisms have drawbacks. For example, these latch mechanisms can require a great deal of strength or space to operate. Also, the designs can be overly complicated and expensive, and they can require additional parts to keep them in stable open and closed positions.

SUMMARY OF THE INVENTION

It is one aspect of the invention to avoid the main drawbacks of the related art, e.g., by providing a snowmobile with an improved latch mechanism that is easy to assemble and manufacture. Another aspect of the invention is to provide a lightweight and durable latch mechanism that can be reliably secured in the open and closed positions with little effort.

These and other aspects and objects of the present invention will be described in or apparent from the following detailed description of preferred embodiments.

BRIEF DESCRIPTION OF THE DRAWINGS

Preferred embodiments of the invention will be described in conjunction with the following drawings, wherein:

FIG. 8 is a top perspective view illustrating a latch according to the present invention FIG. 9 is a bottom perspective view of the latch shown in FIG. 8;

FIG. 16 is a cross-sectional view of the base shown in FIG. 15, along line XVI—XVI;

FIG. 17 is a right side view of the base shown in FIG. 14, with the left side view being a mirror image thereof;

DETAILED DESCRIPTION OF PREFERRED EMBODIMENTS

Figure 1:
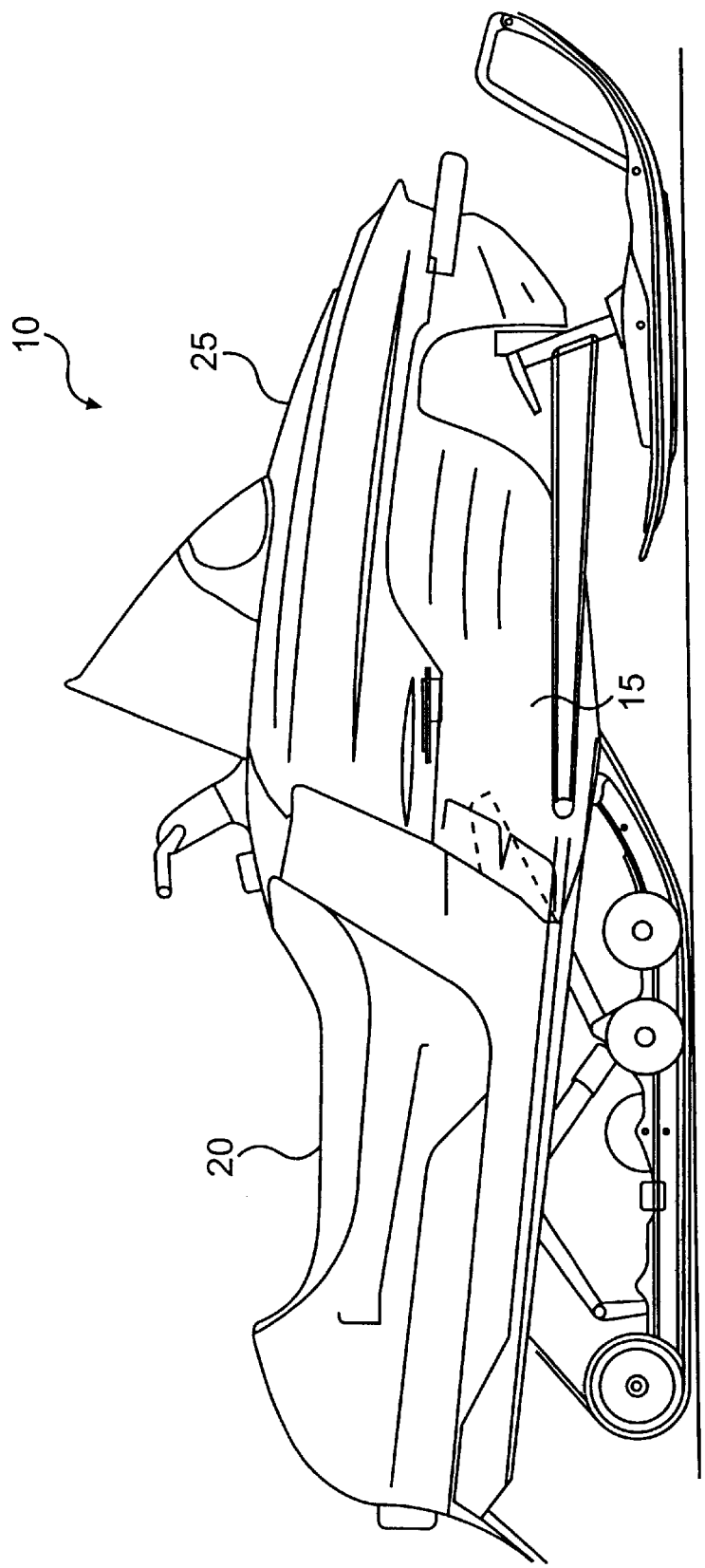
FIG. 1 is a side view of a snowmobile according to the prior art.
Figure 2:
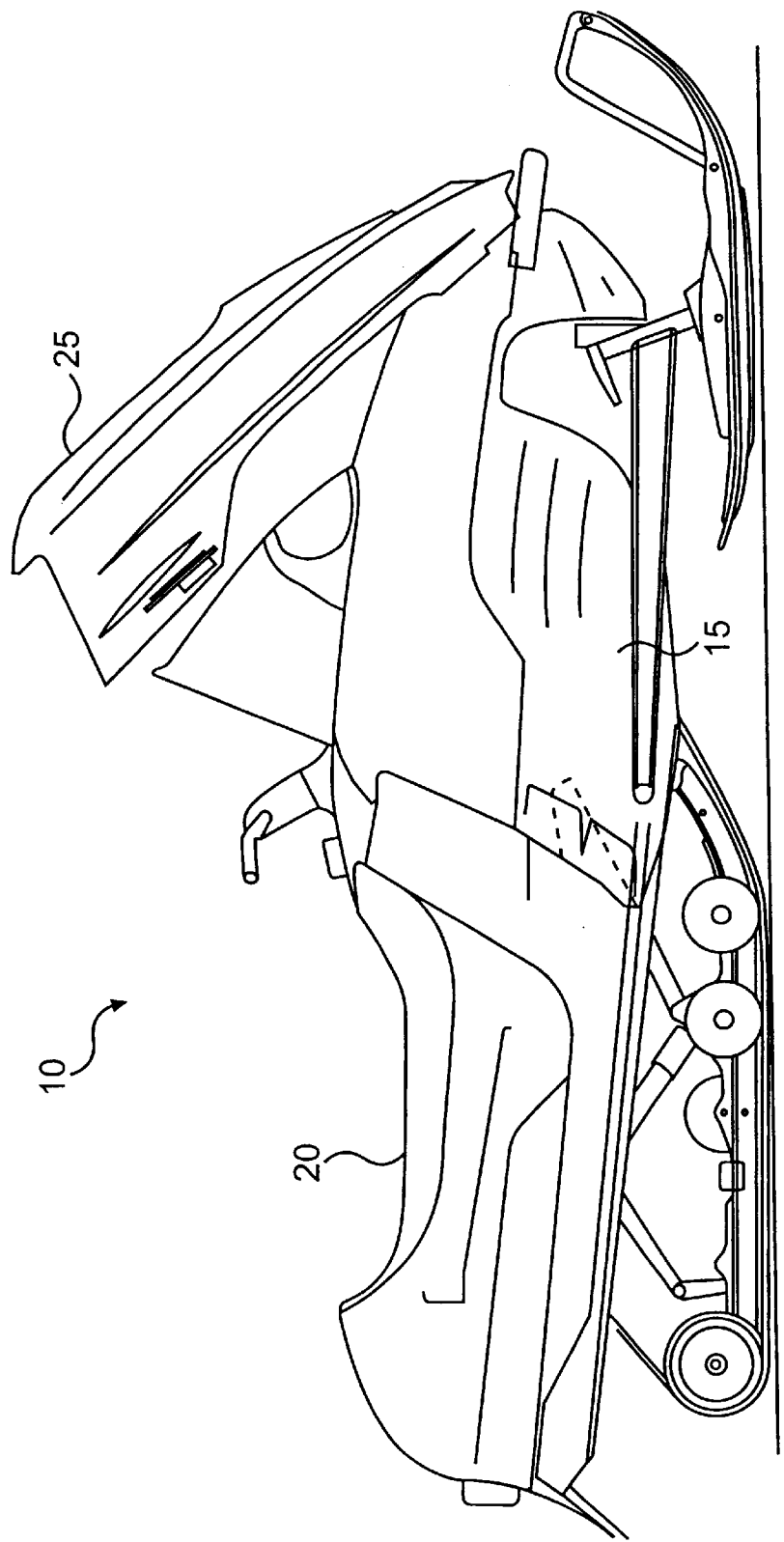
FIG. 2 is a side view of the snowmobile shown in FIG. 1, with the engine cover in an open position.
Figure 3:
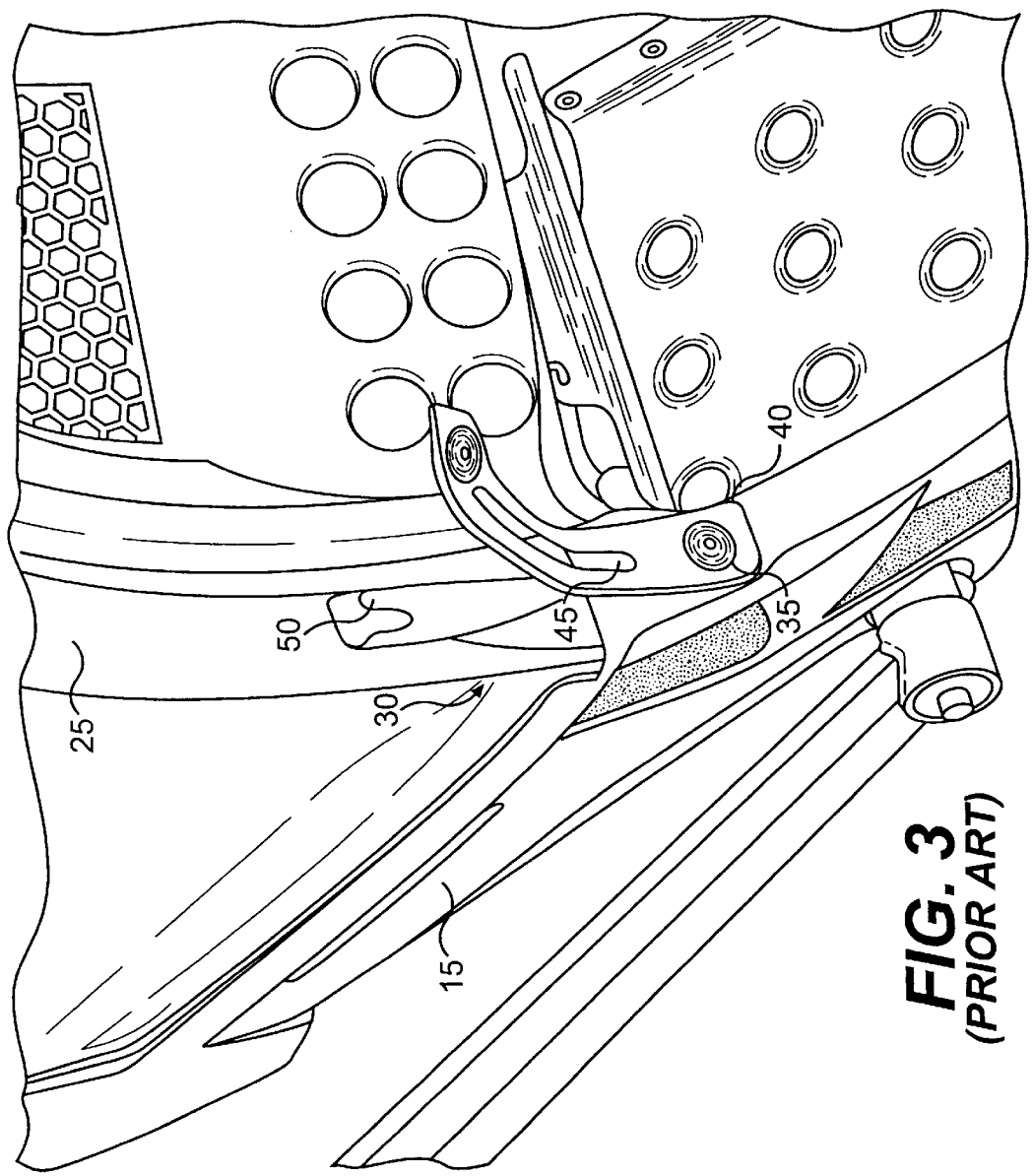
FIGS. 3–7 illustrate engine cover latching mechanisms for snowmobiles according to the prior art.
Figure 4:
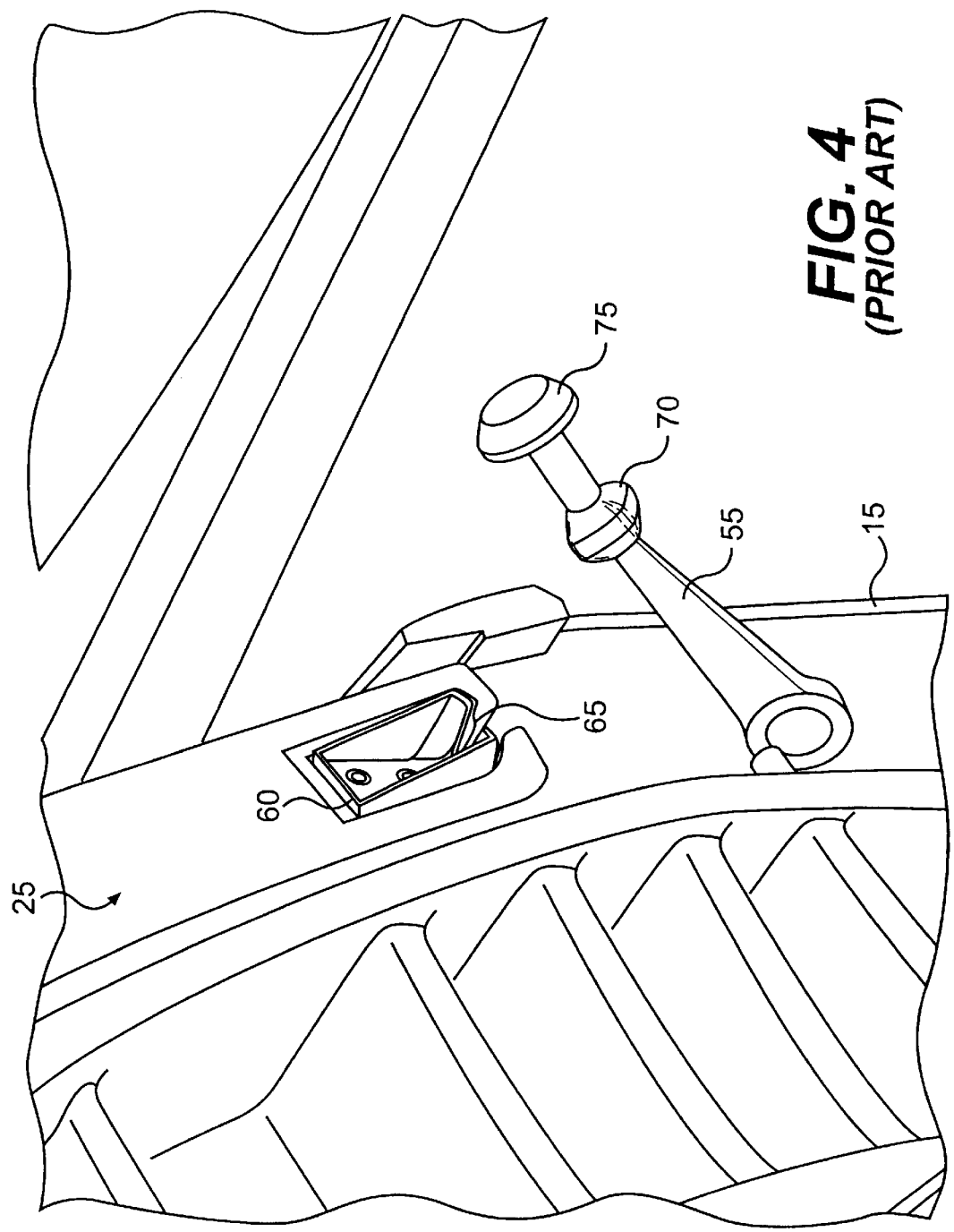
Figure 5:
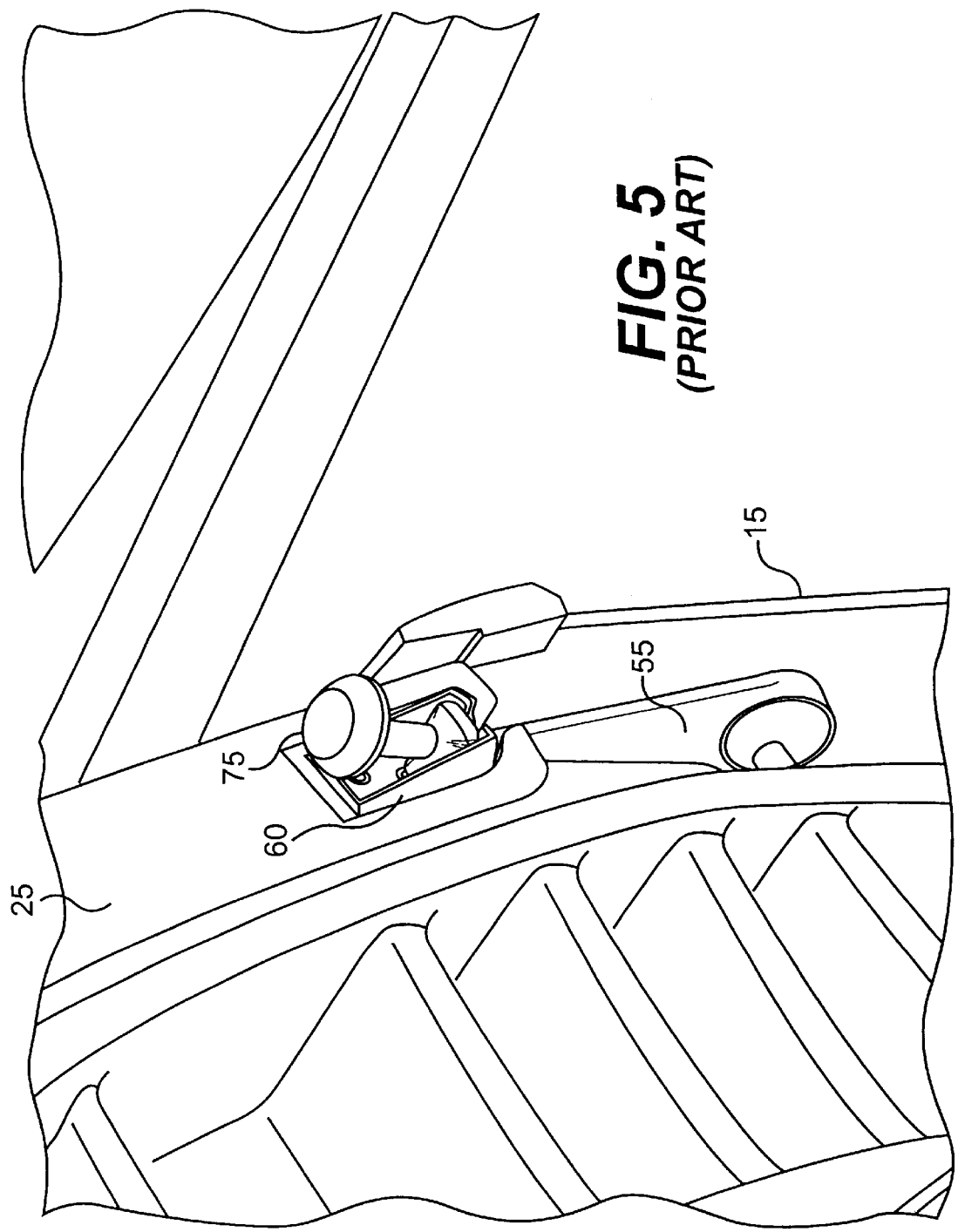
Figure 6A:
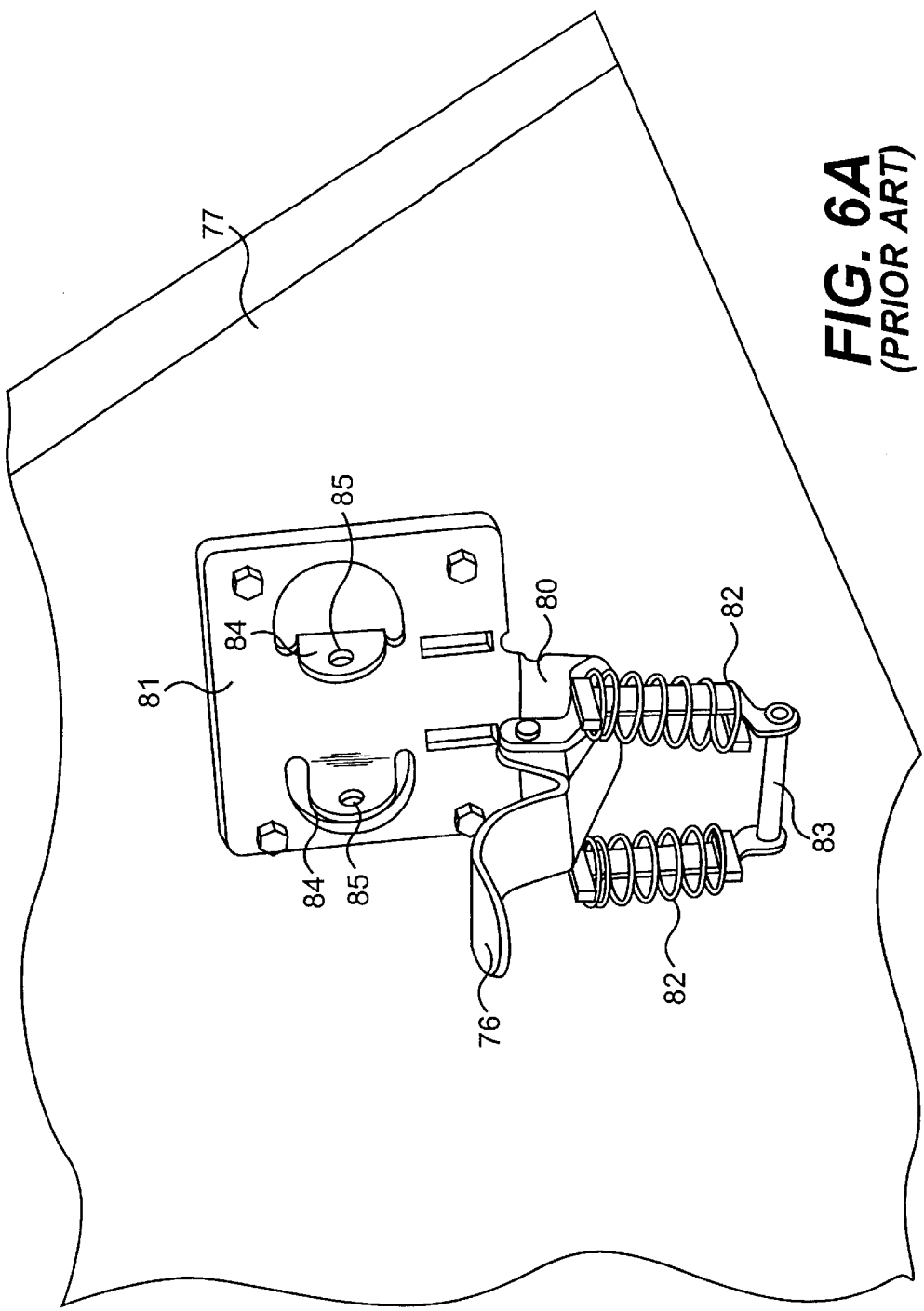
Figure 6B:
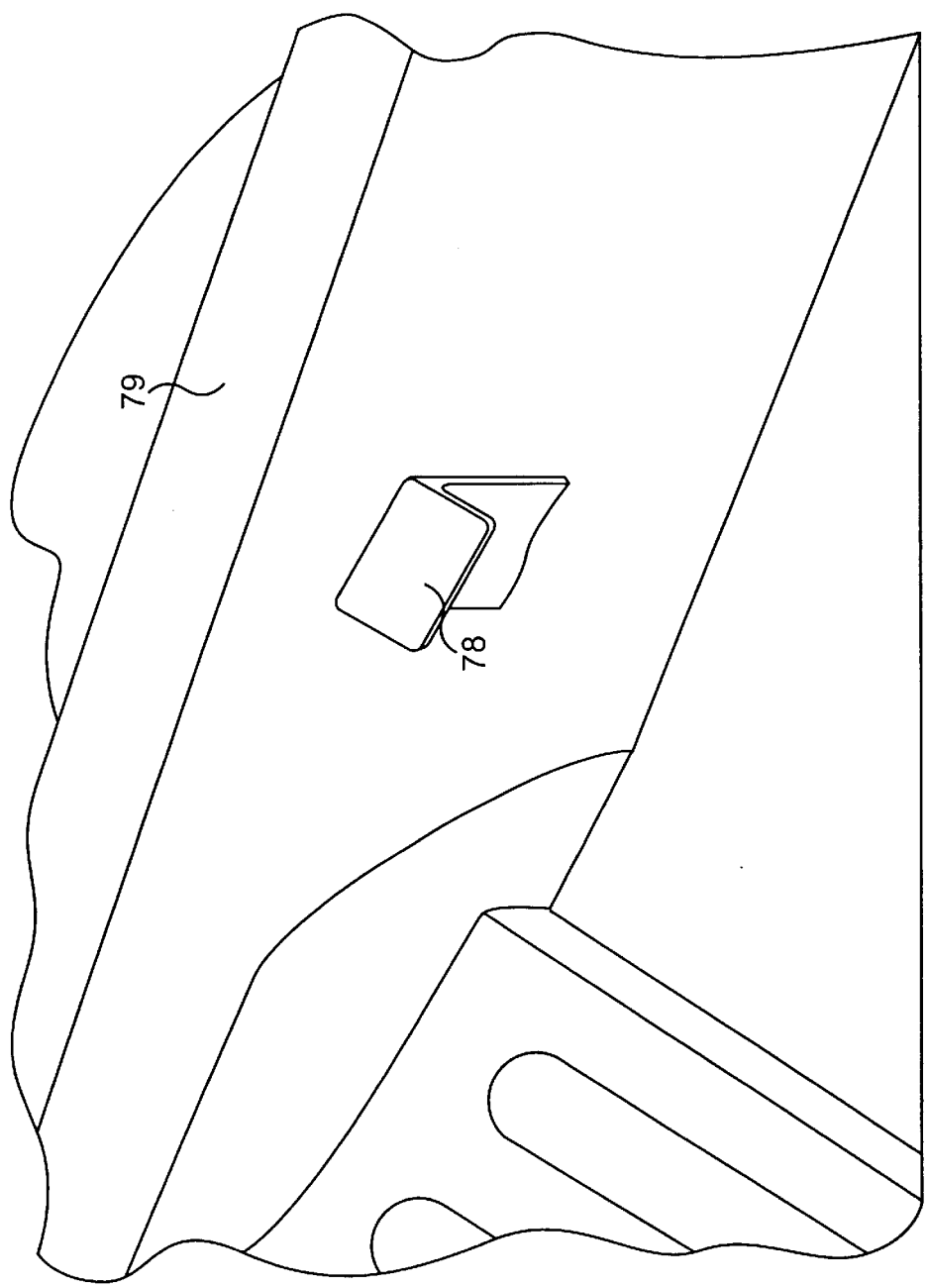
Figure 7:
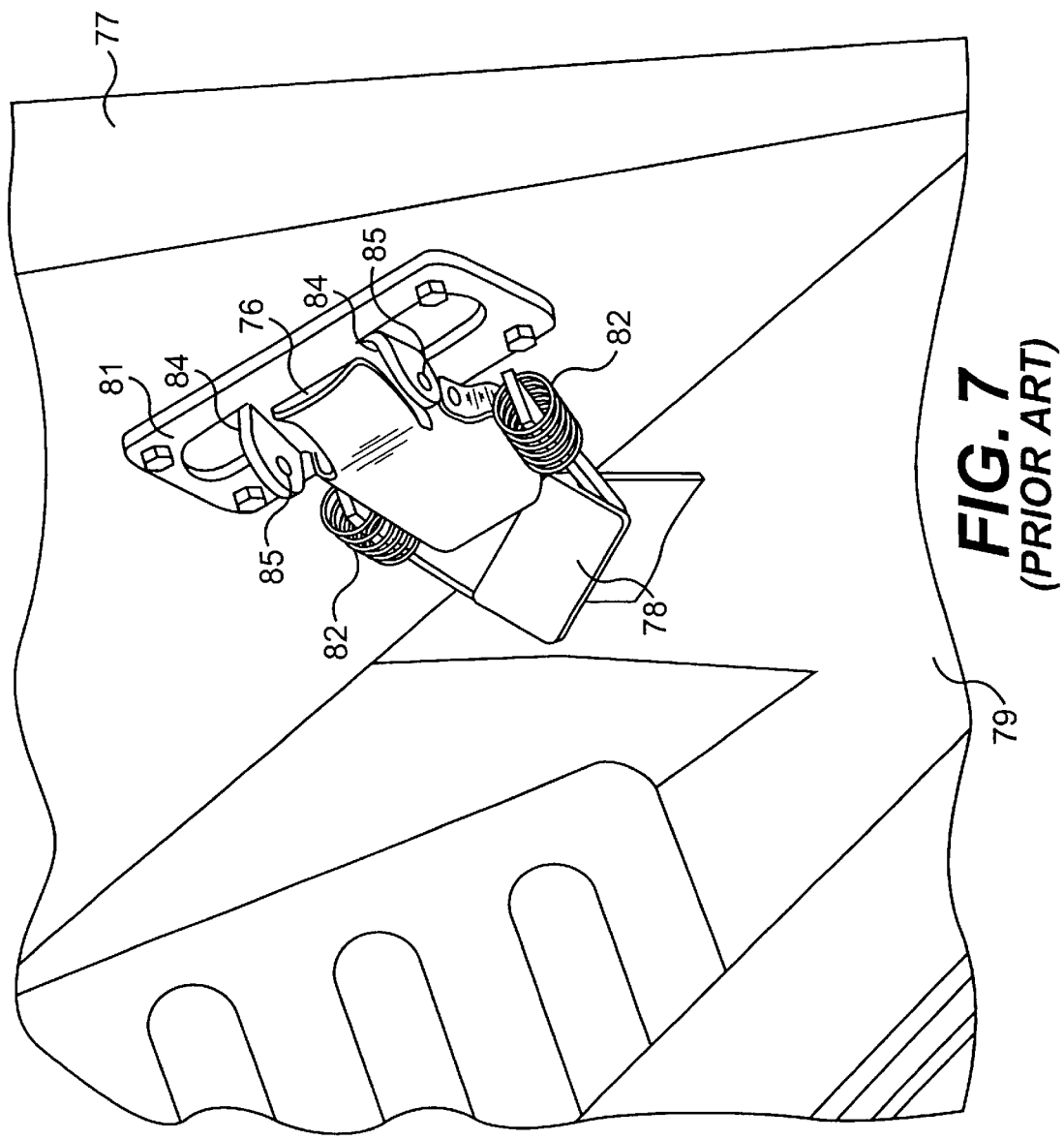

A snowmobile typically includes a cover 160 (see FIGS. 21–30) that is movably and preferably pivotably connected to a main body 161 of the snowmobile. The cover 160 is maintained in the closed position using a latch mechanism. The cover 160 and the main body 161 are similar to the cover and the main body shown in FIGS. 1 and 2.

The latch mechanism includes a latch 165 and a base 170, both of which are preferably made of plastic, although other materials are also possible. FIGS. 8–13 illustrate detailed views of the latch 165, while FIGS. 14–20 illustrate detailed views of the base 170. FIGS. 21–30 illustrate steps involved in assembling the latch 165 to the main body 161, as well as for securing the latch 165 to the cover 160. In the illustrated example, the latch 165 is attached to the main body 161 and the base 120 is attached to the cover 160, although other arrangements are also possible.

Figure 12:
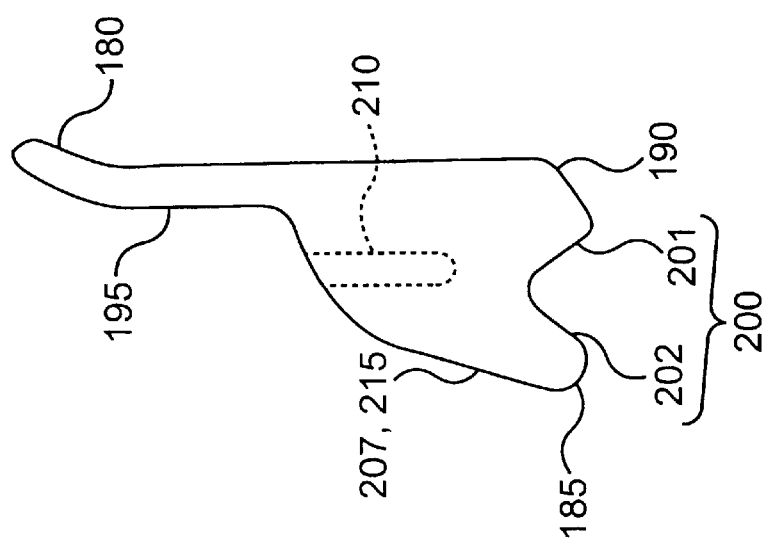
FIG. 12 is a side view of the latch shown in FIG. 8, with the opposite side view being a mirror image thereof.

FIG. 8 is a top perspective view of the latch 165. The latch 165 includes a foot portion 175 and a tab 180. The foot portion 175 includes a pair of laterally spaced apart first foot portions 185, and a second foot portion 190 that is spaced apart from the pair of first foot portions 185 in a widthwise direction. Each of the first foot portions 185 includes a reverse side that includes a lateral cam surface 207, which will be described below. The tab 180 defines a first engagement surface 195 while a second engagement surface 200 is provided between the spaced apart first and second foot portions 185, 190 on each side of the latch 165. The second engagement surface 200 includes a first subportion 201 (FIG. 9) and a second subportion 202. The first subportion 201 preferably extends across the entire width of the latch 165, as shown in FIGS. 9 and 12. The second subportion 202 is broken into three sections, with spaces 203 therebetween.

Figure 11:
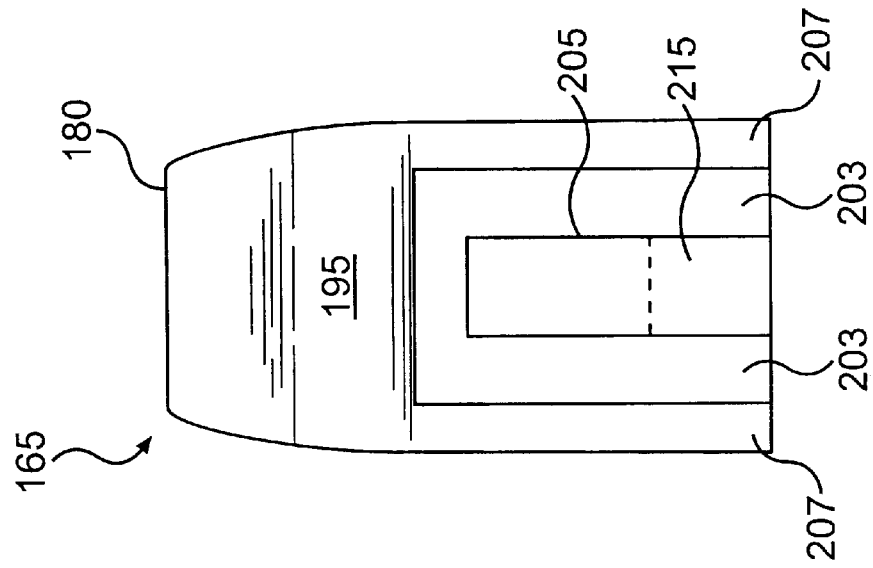
FIG. 11 is a bottom view of the latch shown in FIG. 8.
Figure 10:
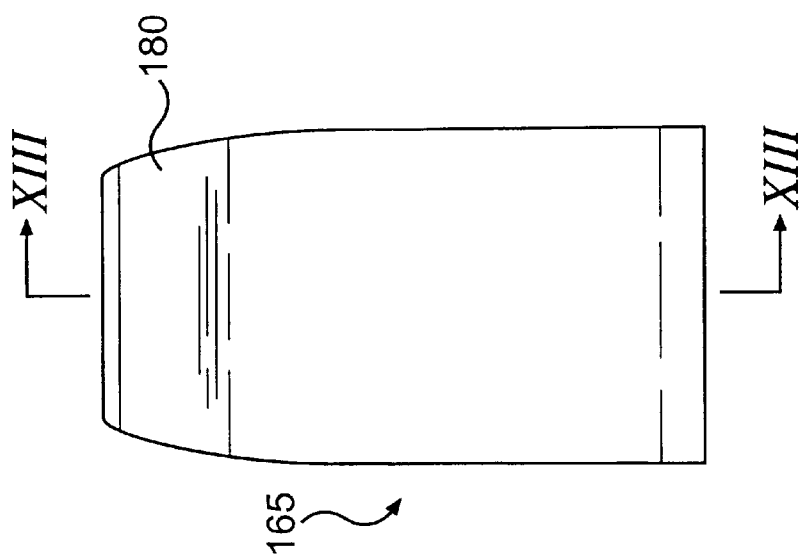
FIG. 10 is a top plan view of the latch shown in FIG. 8.
Figure 13:
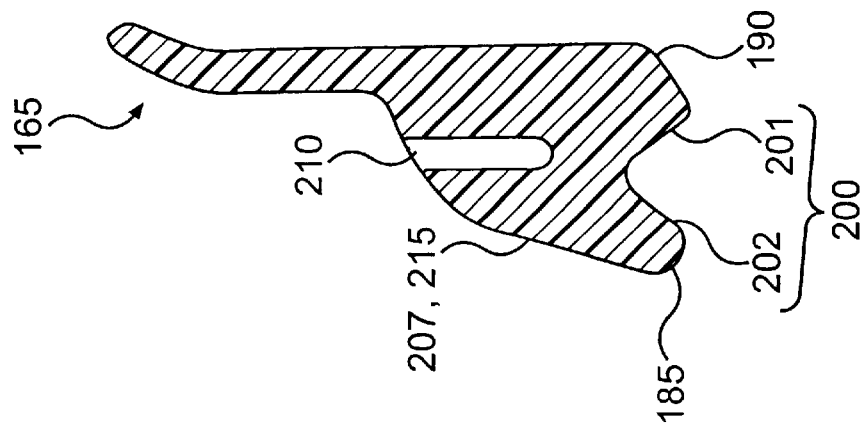
FIG. 13 is a cross-sectional view of the latch shown in FIG. 10, along line XIII—XIII

As shown in FIGS. 8, 11 and 13, the latch 165 includes a retaining member 205 that defines a channel 210 that holds a fastener 265, which is described with reference to FIGS. 21–30. Further, as shown in FIGS. 8, 9 and 11, the retaining member 205 includes a central cam surface 215 that is between the lateral cam surfaces 207 of each of the first foot portions 185, which is more fully explained below. The shape of the outer surface of the retaining member 205 is substantially identical to the shape of the outer surfaces of the pair of first foot portions 185.

As shown in FIGS. 14–20, the base 170 includes a plate-like member 220 having an aperture 225 therethrough. The base 170 includes a plurality of holes 230 for receiving a suitable fastening member (not shown), for example a rivet, that connects the engine cover 160 to the base 170. The base 170 includes a raised ledge 235, the significance of which will be described below in reference to FIGS. 29 and 30. The base 170 also includes a first engageable surface 240 positioned on one side of the aperture 225, and a second engageable surface 245 provided on a second side of the aperture 225, opposite to the first side of the aperture.

Figure 14:
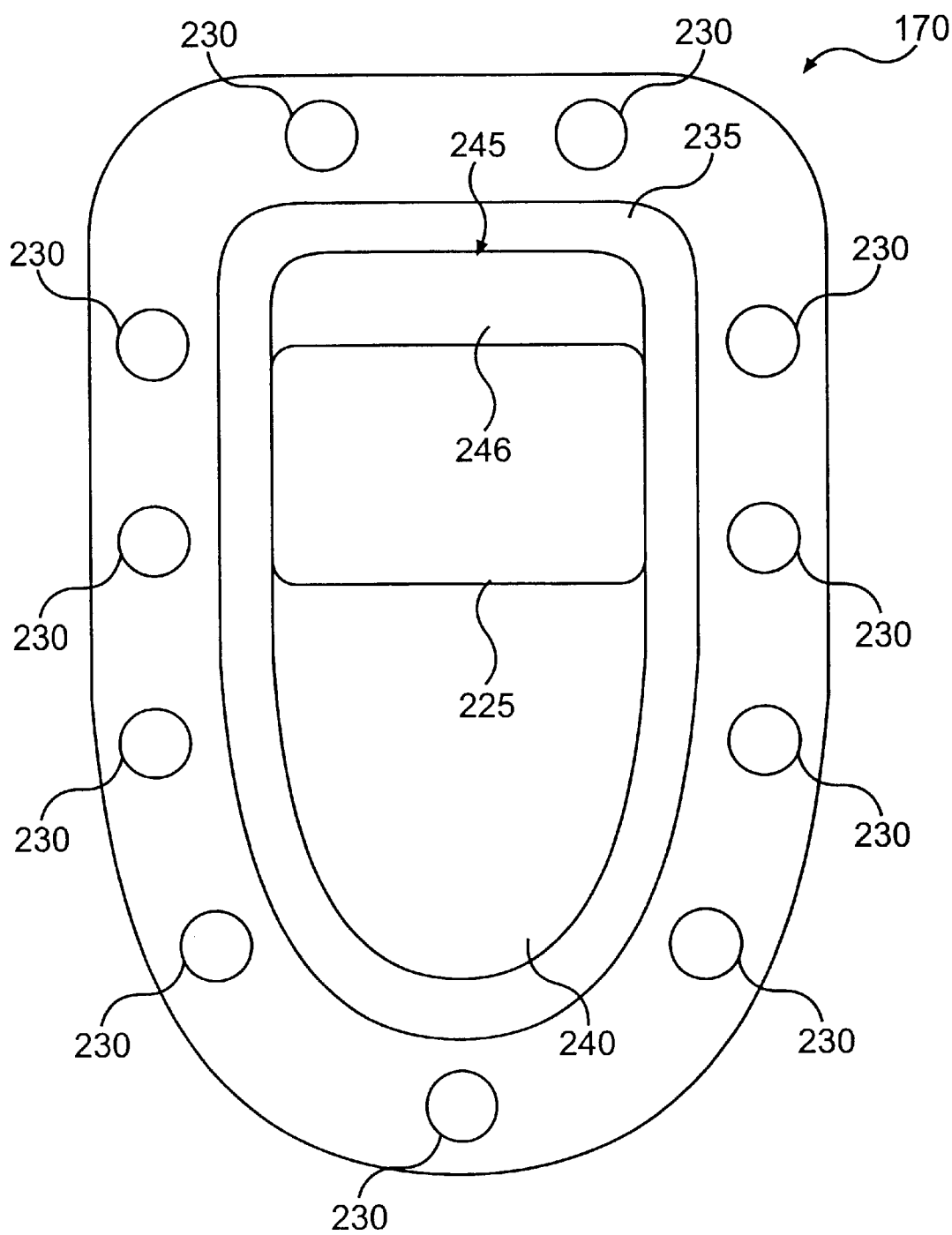
FIG. 14 is a top plan view of a base of the latch assembly according to the present invention.
Figure 15:
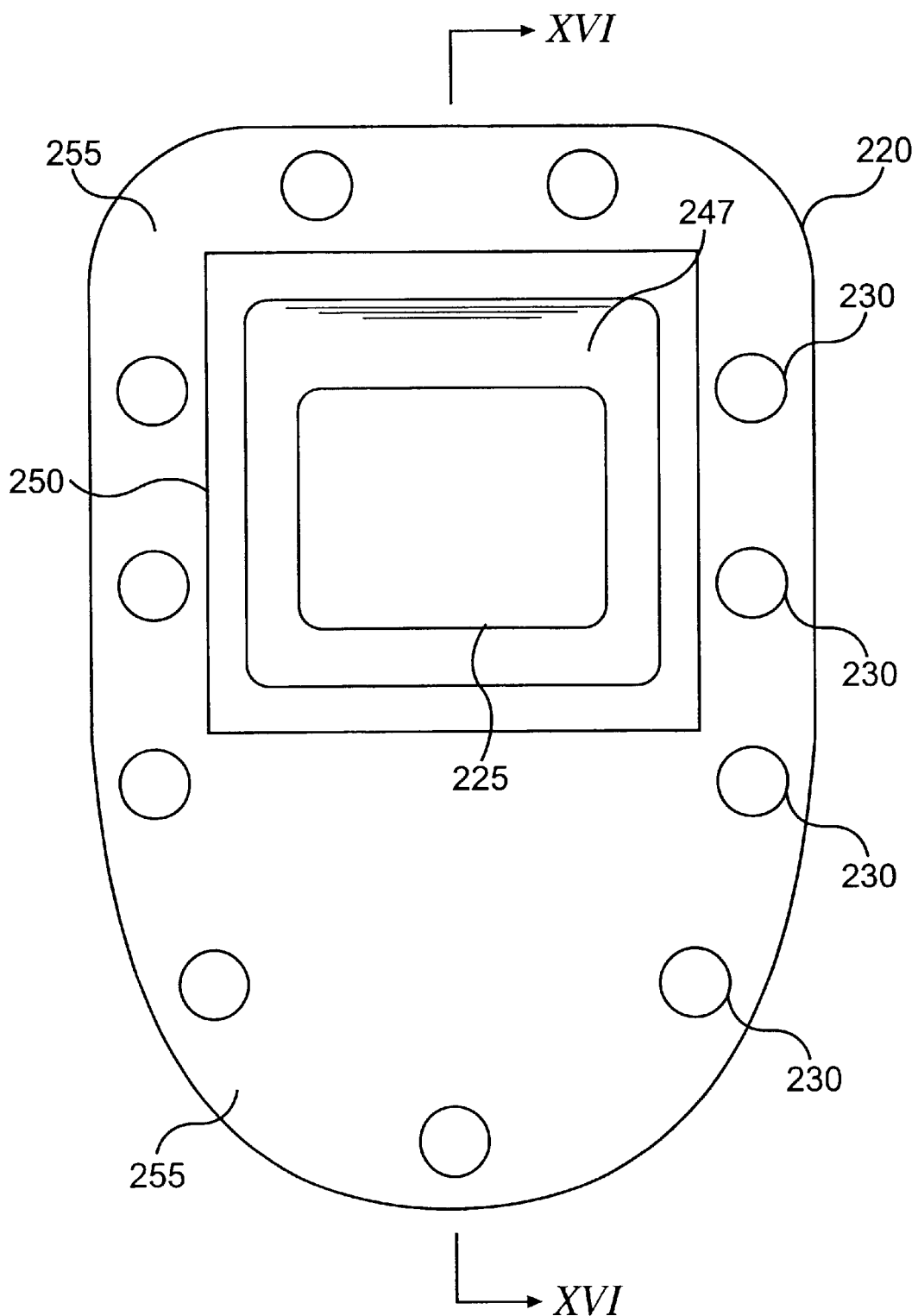
FIG. 15 is a bottom view of the base shown in FIG. 14.
Figure 18:
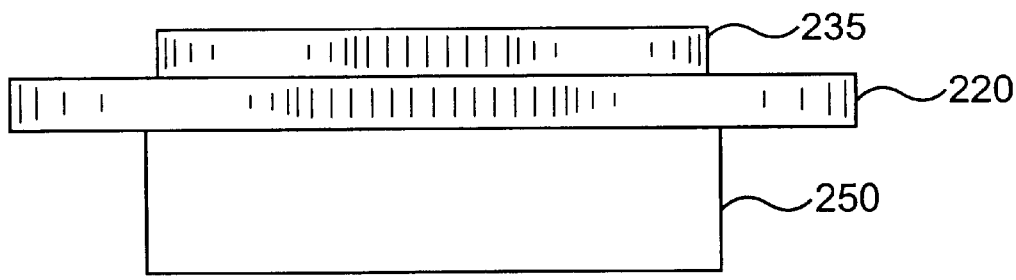
FIG. 18 is a front view of the base shown in FIG. 14.
Figure 19:
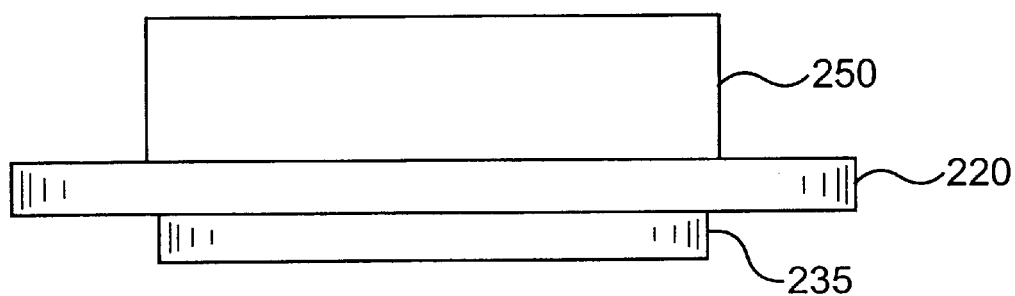
FIG. 19 is a rear view of the base shown in FIG. 14.
Figure 20:
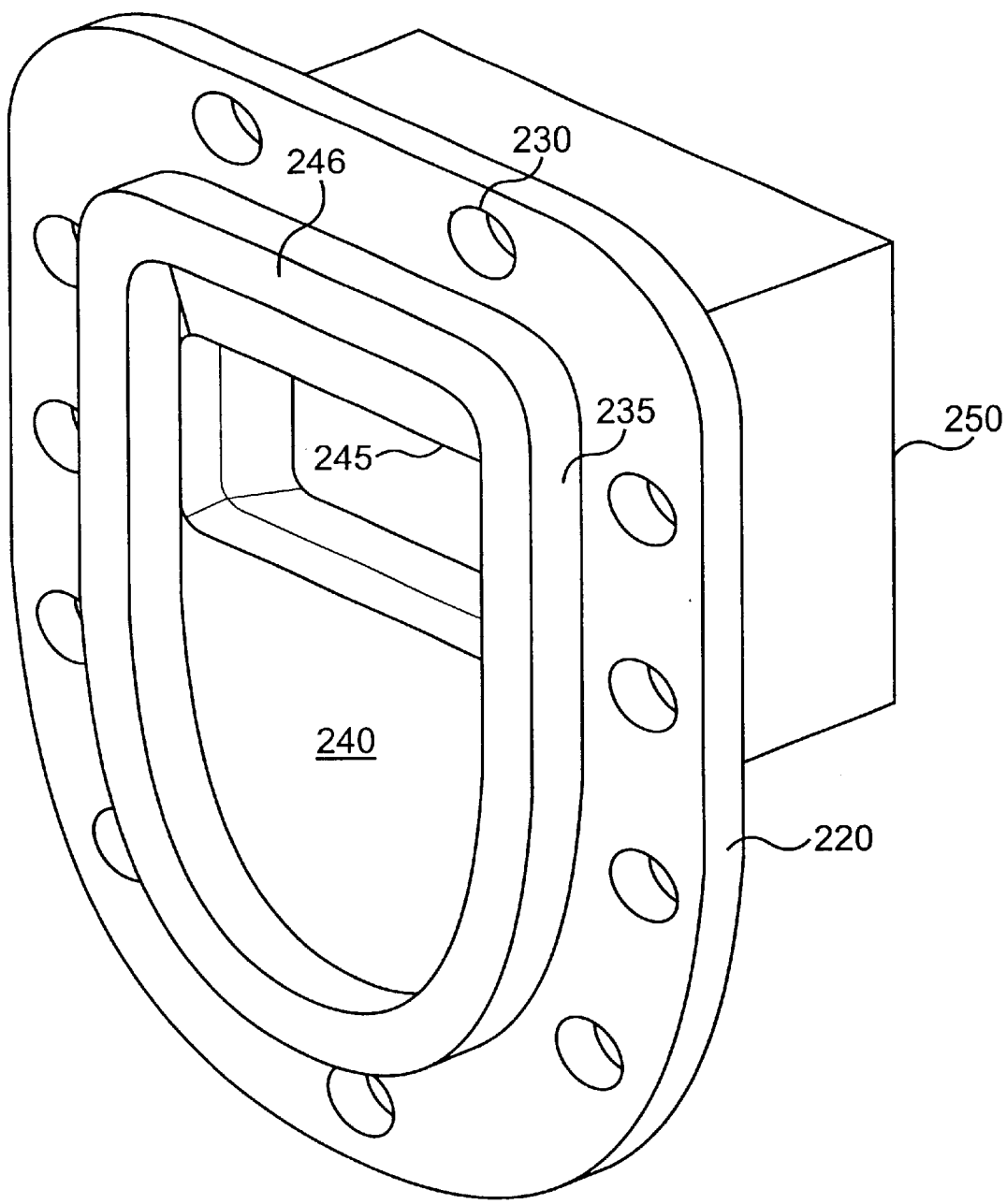
FIG. 20 is a top perspective view of the base shown in FIG. 14.

The base 170 includes a housing 250 that is mounted to a rear surface 255 of the plate-like member 220, as shown in FIGS. 15–20. As shown in FIGS. 14–16, it can be seen that the second engageable surface 245 includes first and second subportions 246, 247 that converge with one another to form an arrow shaped member that is intended to be received between the first and second feet 185, 190 of the latch 165, as will be explained with reference to FIGS. 26–30. FIG. 16 also shows the shape of the second engageable surface 245.

Figure 21:
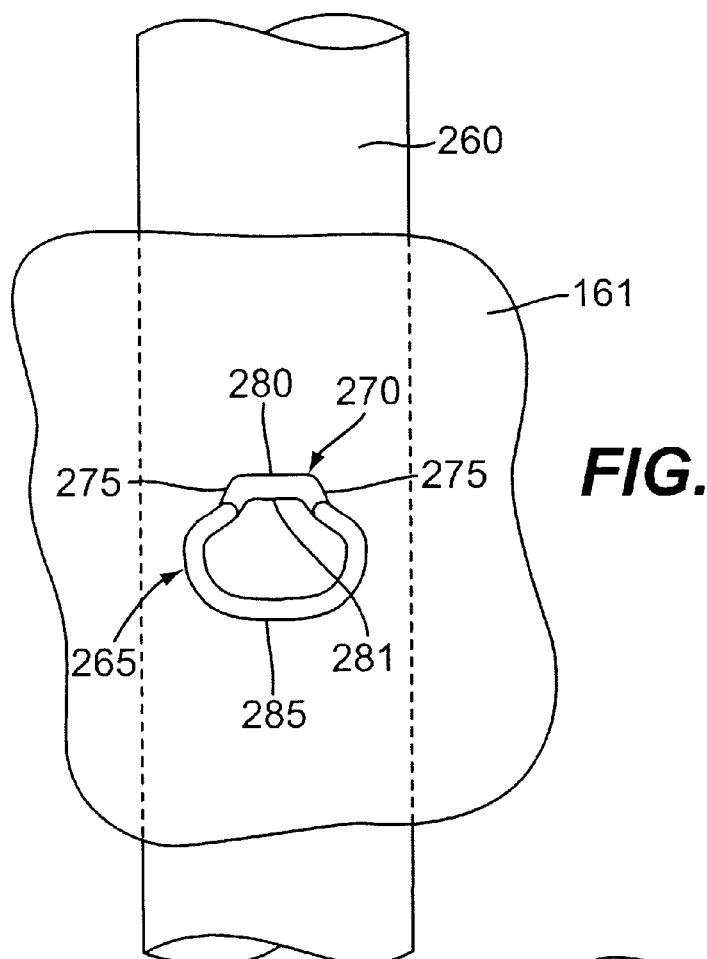
FIGS. 21–30 illustrate steps for assembling and operating the latch mechanism according to the present invention.
Figure 22:
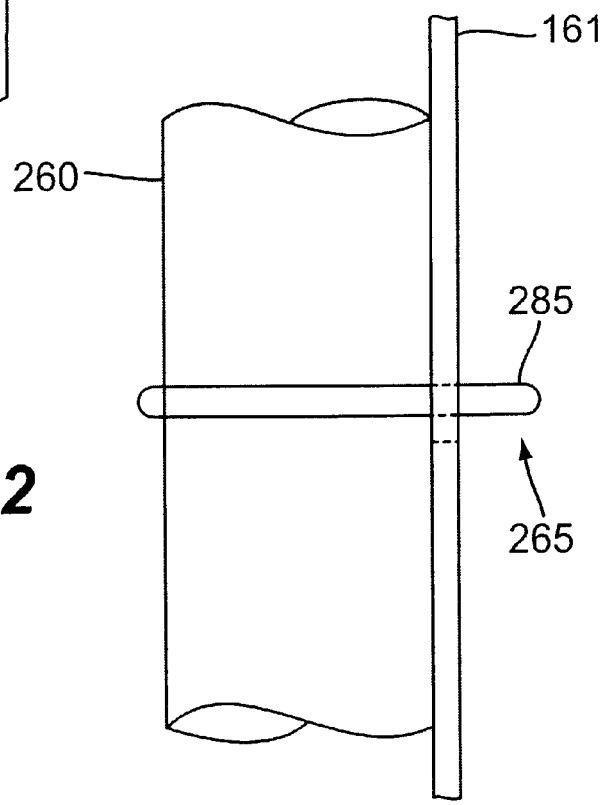

With reference to FIGS. 21–30, the assembly and operation of the latch mechanism 155 will be explained. In FIGS. 21 and 22, reference number 260 represents a frame member that is provided inside the main body 161 of the snowmobile. The frame member 260 has a round cross section, but other cross-sectional shapes and configurations are possible. Only a portion of the main body 161 is shown in FIGS. 21 and 22. The main body 161 is adjacent to or coupled to the frame member 260. In FIGS. 21 and 22, a fastener 265, for example, a resilient ring-shaped member, is shown as surrounding the frame member 260 and extending through an aperture 270 within the main body 161. The aperture 270 is provided with two leg portions 275 connected by a central portion 280. The shape of the aperture 270 within the main body 161 helps ensure that the fastener 245 can be inserted through the aperture 270, and a tabbed portion 281 formed between the leg portions 275 helps prevent the fastener 265 from slipping through the aperture 270. The frame member 260 may be thought of as an anchor member for anchoring the fastener 265.

Figure 23A:
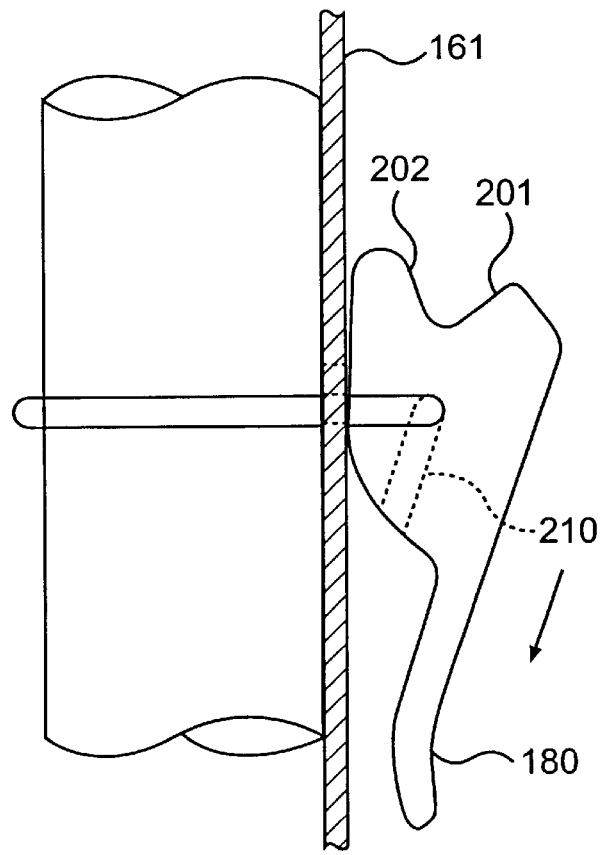
Figure 23B:
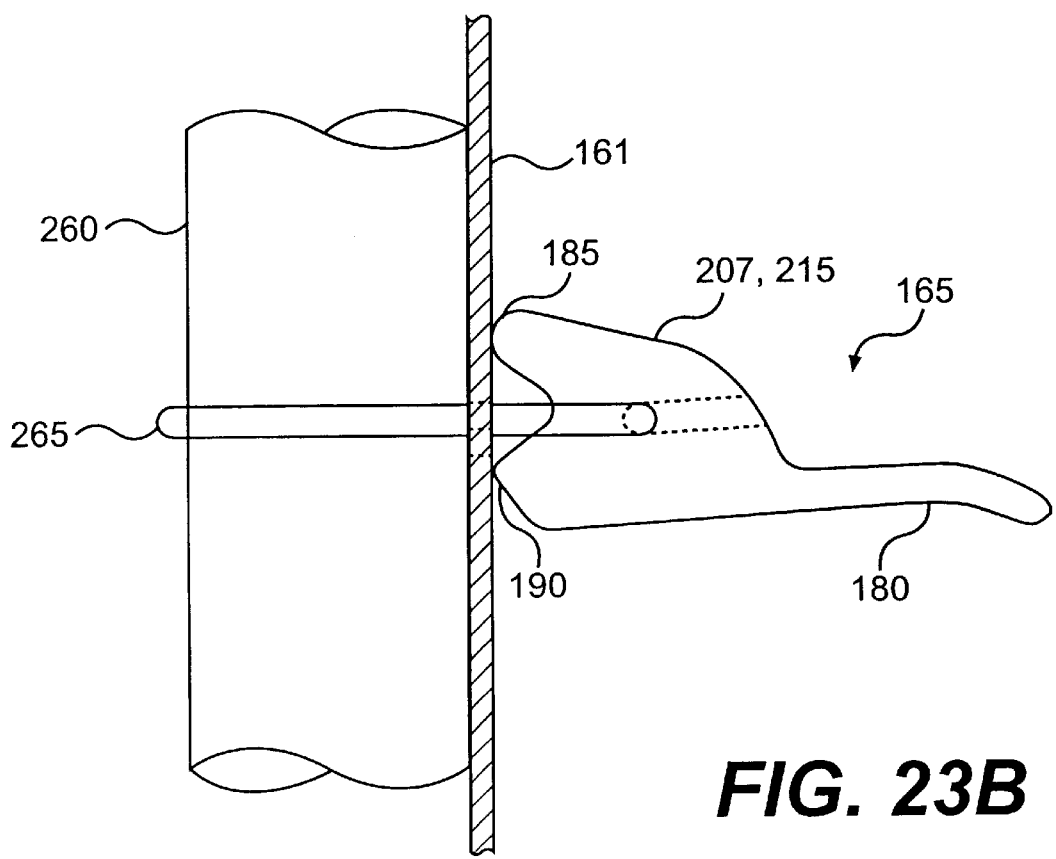
Figure 24:
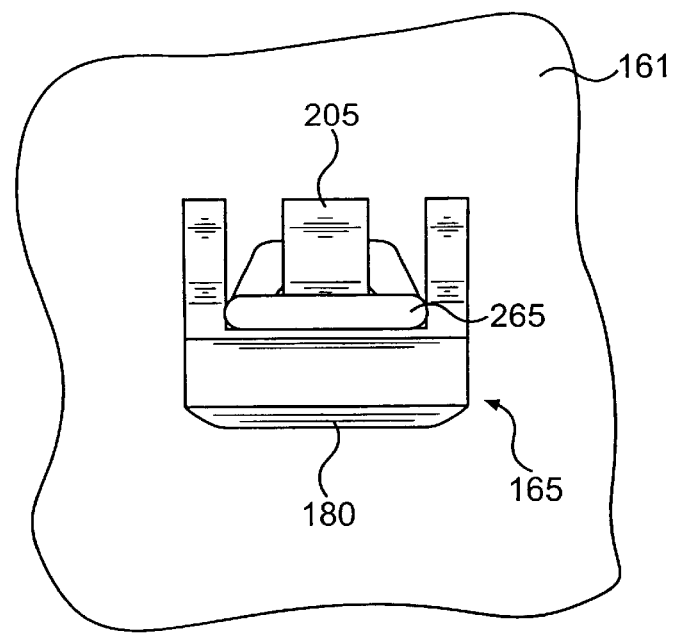
Figure 26:
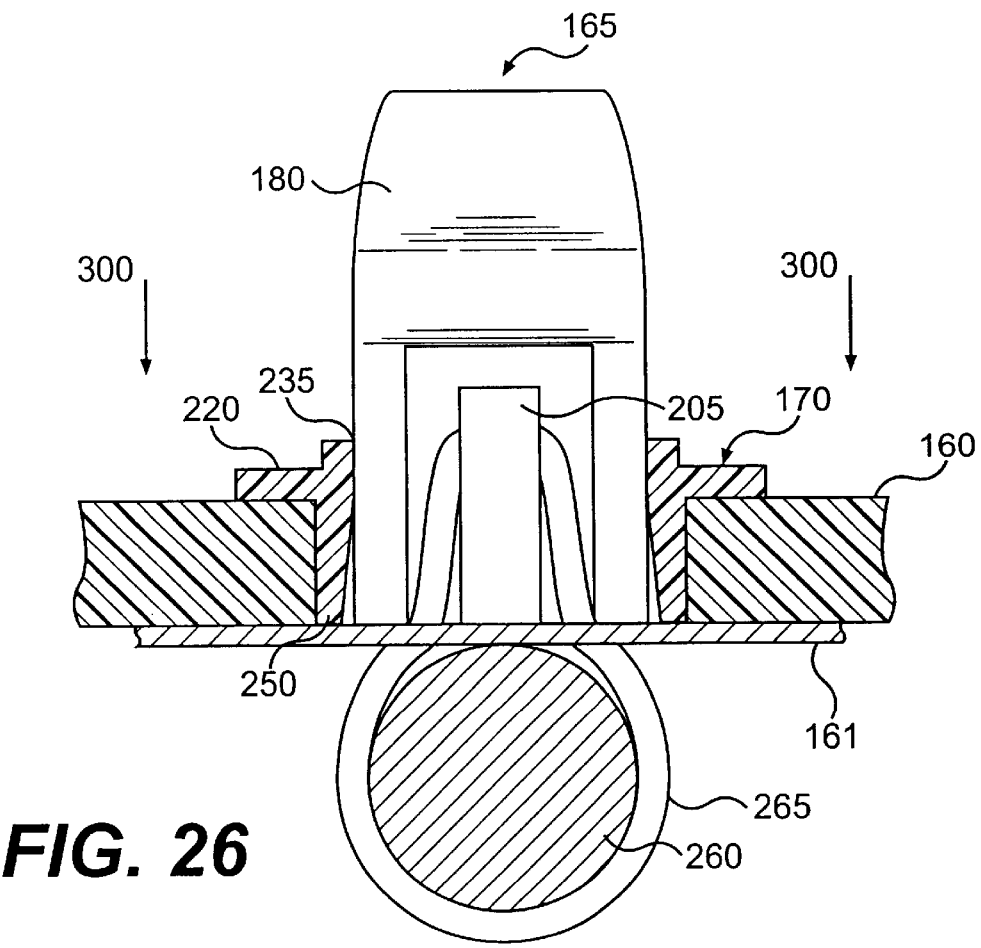

A looped portion 285 of the fastener 265 shown in FIGS. 21 and 22 is sized and configured such that the retaining member 265 provided to the latch 165 can be hooked through the looped portion 285 of the fastener 265. Once the fastener 265 is received within the channel 210 of the latch 165 through the fastener (FIG. 23A), the latch is positioned (e.g., pivoted) into its upright position, as shown in FIG. 23B. FIG. 26 is a top plan view of the latch 165 as it is positioned on the main body 161. Of course, the order of this operation can be reversed, e.g., the fastener 265 can be attached to the latch 165, and the other end of the fastener 265 can be inserted through the aperture 270 and anchored to the frame member 260. Further, the latch 165 can be mounted in its upright position without first assuming the position in FIG. 23A. However, the fastener 265 is under less tension when the latch 165 is in the position shown in FIG. 23A. Therefore, the latch 165 can be more easily assembled to the frame member 260 in the position shown in FIG. 23A.

Figure 25:
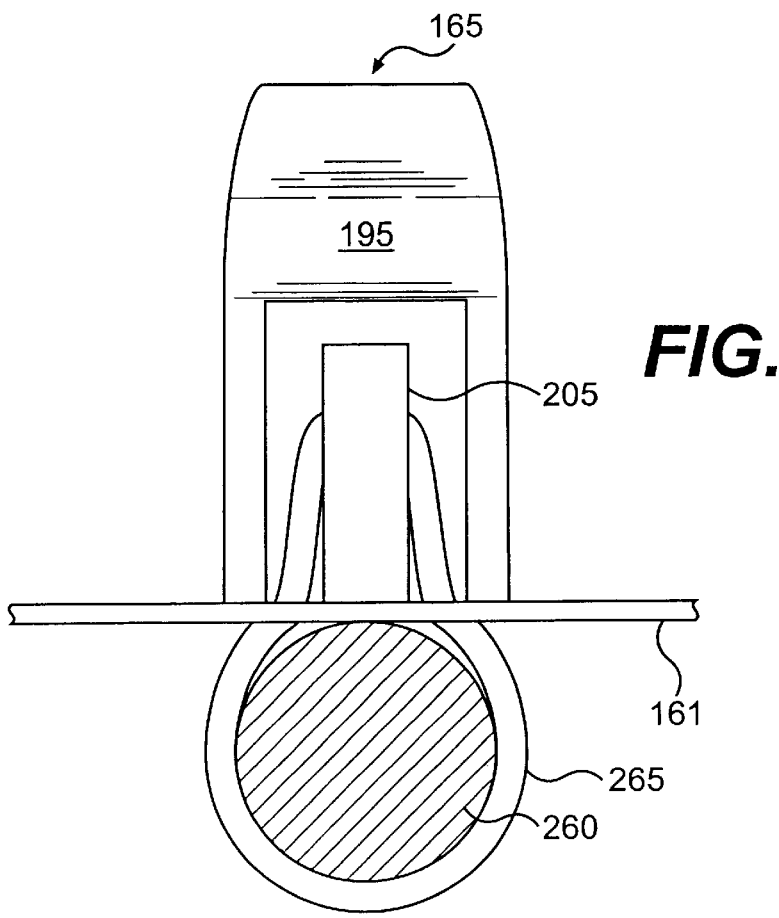

As seen in FIG. 26, the fastener 265 is positioned within the channel 210 of the retaining member 205 of the latch 165. The fastener 265 is held under predetermined tension which enables the latch to be maintained in the position shown in FIGS. 23B, 24 and 25, in which the latch 165 extends perpendicularly away from the main body 161, with the frame member 260 anchoring the opposite end of the fastener 265. FIG. 25 illustrates a front view of the latch 165 in the open or first stable position. In the first stable position, the first and second foot portions 185, 190 are engaged with the upper surface of the main body 161, under tension of the fastener 265. A portion of the retaining member 205 is also in contact with the main body 161.

Figure 27:
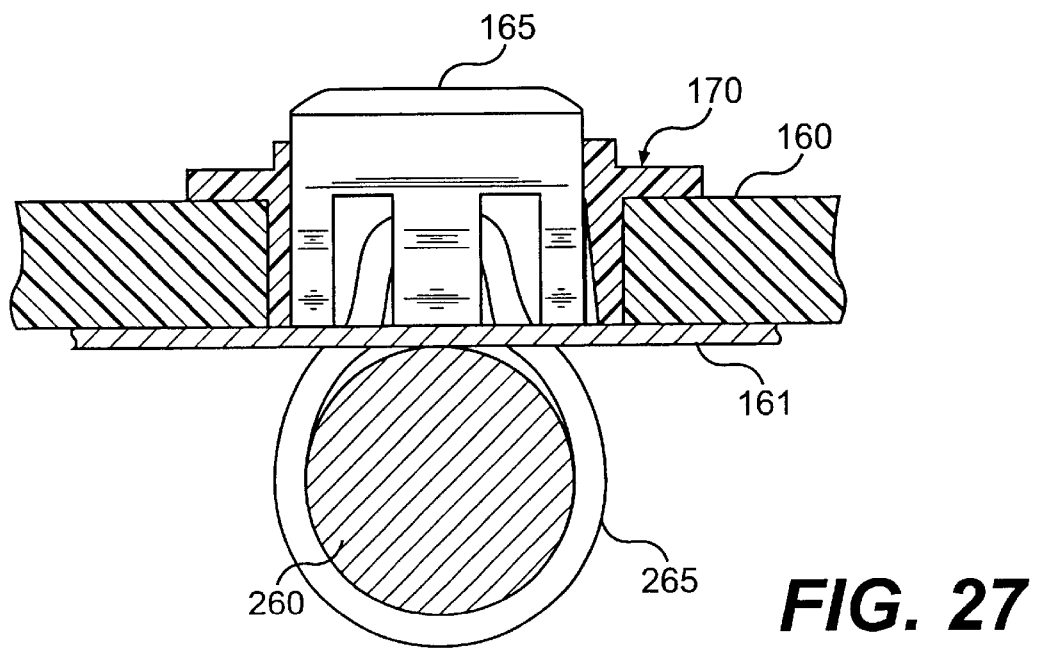
Figure 29:
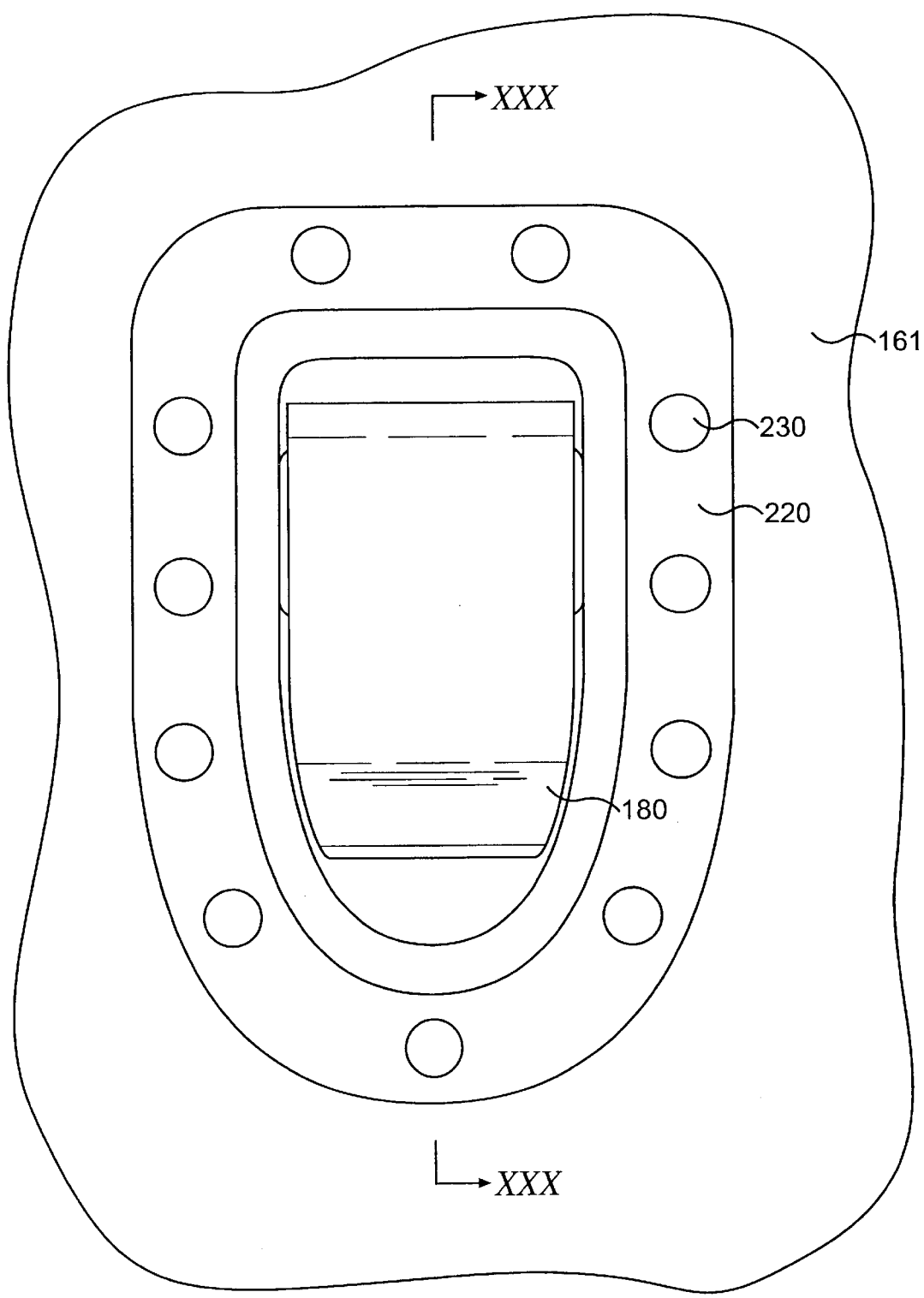
Figure 30:
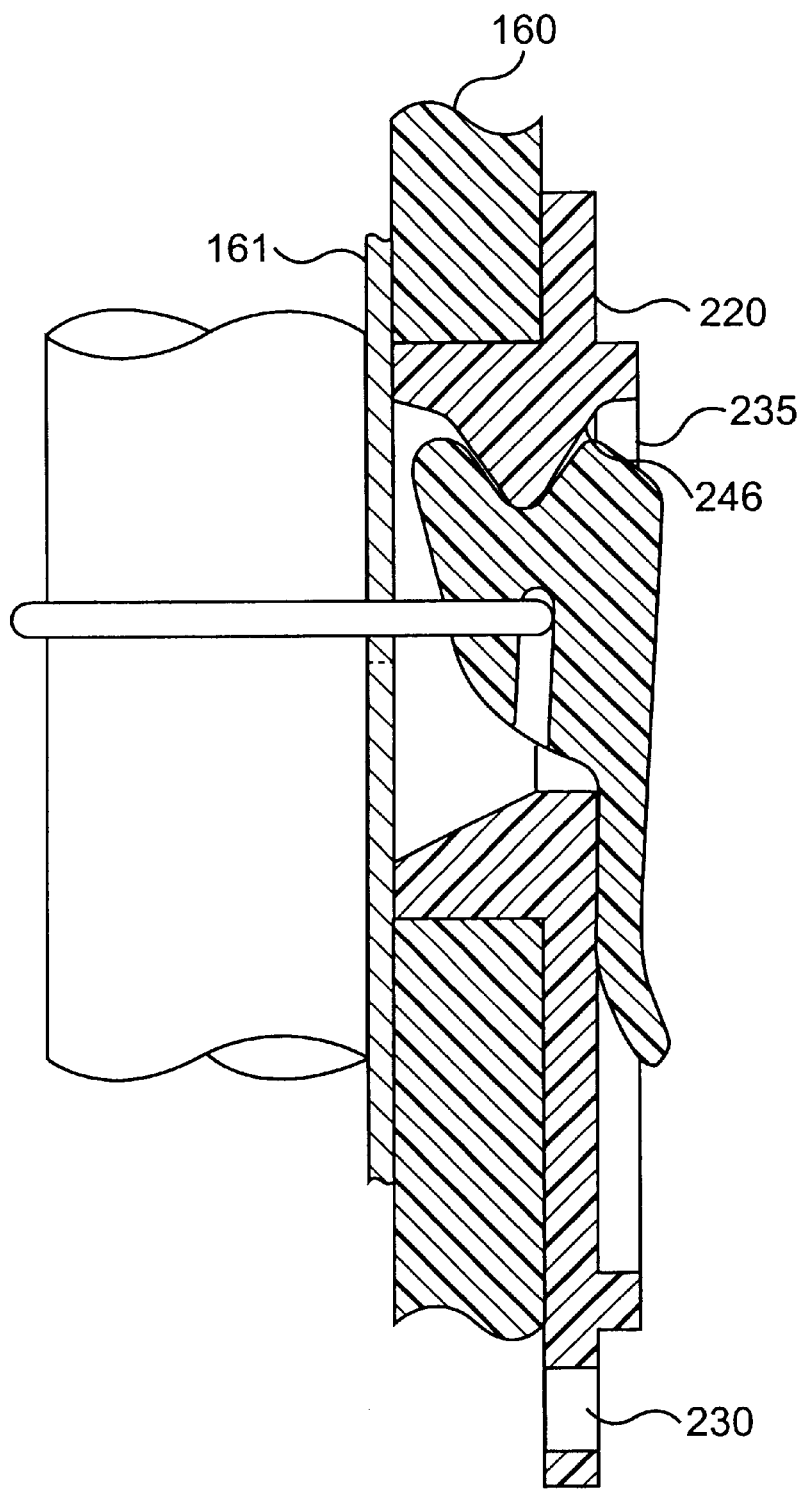

With the latch positioned as shown in FIGS. 23B–25, the cover 160 is moved or pivoted (as indicated by arrows 300) such that the aperture 225 of the base 170 aligns with the tab 180 of the latch 165. If the latch 165 and the base 170 are aligned, the latch 165 will be inserted through the aperture 225, as shown in FIG. 26. In this position, the housing 250 and the cover 160 rest flush against the main body 161. Once this position is reached, the latch 165 is pivoted downwardly toward the base 170 such that the first engagement surface 195 of the latch 165 engages the first engageable surface 240 of the base 170. At the same time, the second engagement surface 200 of the latch 165, which is positioned at the foot portion 175 of the latch 165, engages with the second engageable surface 245 of the base. In particular, the first and second subportions 201, 202 of the second engagement surface 200 of the latch 165 are placed into contact, respectively, with the first and second subportions 246, 247 of the second engageable surface 245 of the base 170. FIGS. 27, 29 and 30 show the latch 165 in the closed or stable position, in which the cover 160 is secured with respect to the main body 161.

Figure 28A:
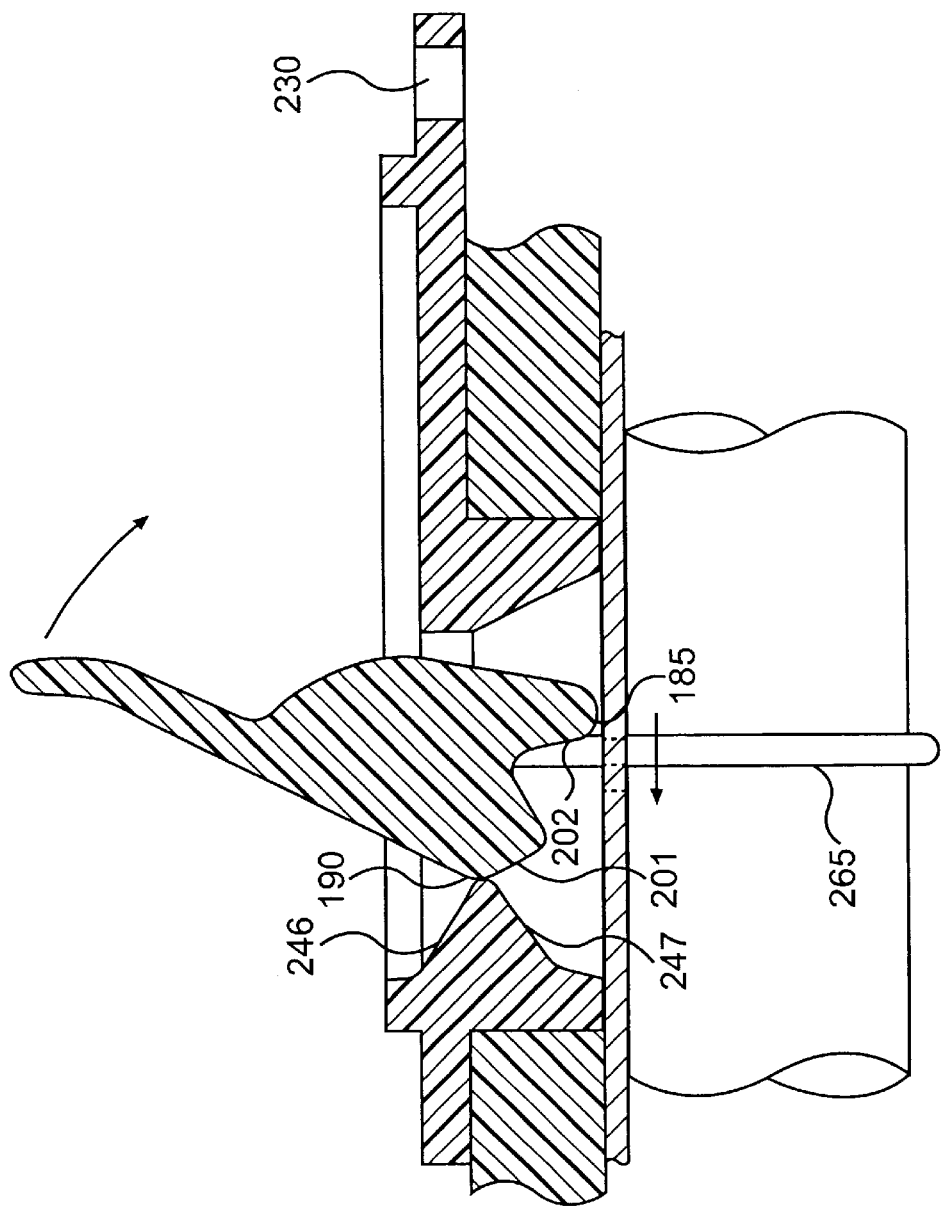
Figure 28B:
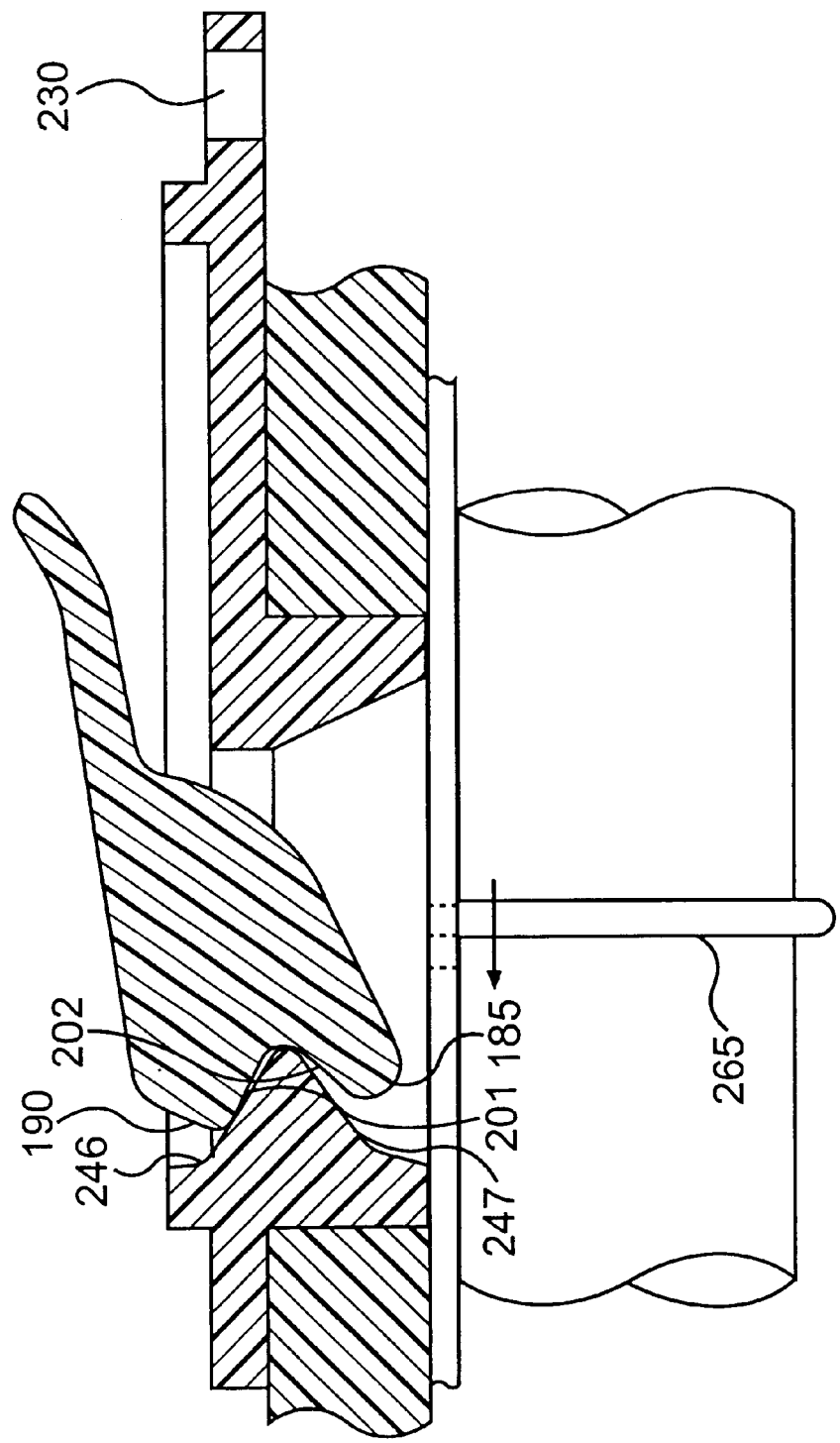

FIG. 28 shows the latch 165 in an intermediate position during pivoting. Initially, the latch 165 is pivoted about the pair of first foot portions 185, such that the second foot portion 190 clears the arrow-shaped portion of the second engageable surface 245 of the base 170. As the foot portion 190 is clearing the second engageable surface 245, the latch 165 rolls such that lateral and central cam surfaces 207, 215 contact the main body 161. At the same time, the lateral and central cam surfaces 207, 215 of the latch engage against the side of the aperture 225 adjacent the first engageable surface 240 of the base 170, which causes the cam surfaces 207, 215 to slide with respect to the main body 161. This sliding continues until the first subportion 201 of the latch 165 slides over the first subportion 246 of the base 170, and the second subportion 202 of the latch 165 slides under the second subportion 247 of the base 170. When sliding of the latch 165 is halted, these surfaces engage one another with the latch 165 in a stable, closed condition. When the latch 165 is opened, the first subportion 201 of the latch 165 slides along the first subportion 246 of the base 170, and the cam surfaces 207, 215 slide along the main body 161, until the pair of first foot portions 185 are again established as the pivot point for the latch 165.

As shown in FIGS. 27, 29 and 30, when the latch 165 is in the closed position, the ledge 235 of the base 170 provides a protective perimeter such that the latch 165 cannot be inadvertently opened during movement of the snowmobile, e.g., by passing branches of a tree. Also, FIG. 30 shows that the tab 180 of the latch 165 is slightly curved so as to allow the rider to easily access the latch 165 for opening purposes. Moreover, the latch 165 can be oriented on the main body 161 such that it is pivoted downwardly toward the footrest, or it can be pivoted toward the rear of the snowmobile when placed in the secured position. With this orientation, the chances of inadvertent opening of the latch mechanism can be reduced.

While preferred embodiments of the invention have been shown and described with reference to the accompanying figures, it is evident that variations and modifications are possible that are within the spirit and scope of the preferred embodiments described herein. In addition, while the latch mechanism has been described with reference to use with a snowmobile, most if not all the features of the described latch mechanism could be applied to other environments as well, such as for other vehicles, or for securing members that are movable with respect to one another.

What is claimed is:

1. A motor vehicle having at least one compartment that can be accessed using a latch mechanism, the motor vehicle comprising a first member and a second member moveable with respect to the first member, wherein the latch mechanism includes a latch provided to the first member and a base provided to the second member, the latch including a foot portion at a proximal end thereof and a tab at a distal end thereof opposite the proximal end, the tab having a first engagement surface and the foot portion having a second engagement surface, the latch being movable between a first stable position in which the tab of the latch extends away from the first member and a second stable position in which the tab extends substantially parallel to the first member, the base including an aperture sized to receive the tab of the latch, the base including a first engageable surface adjacent a first side of the aperture and a second engageable surface on a second side of the aperture diametrically opposite to the first side, wherein, in order to secure the first member to the second member, the tab of the latch, in its first stable position, is inserted through the aperture of the base, and the latch is moved from the first stable position to the second stable position in which the first engagement surface of the tab engages the first engagement surface of the base and the second engagement surface of the foot portion engages the second engagement surface of the base.

2. The motor vehicle of claim 1, wherein the foot portion of the latch, as seen transversely to the tab, includes first and second foot portions that engage the first member when the latch is in the first stable position.

3. The motor vehicle of claim 2, wherein the second engagement surface of the latch is positioned between the first and second foot portions.

4. The motor vehicle of claim 1, wherein the foot portion includes a cam surface that engages the first side of the aperture in the base when the latch moves from the first stable position to the second stable position.

5. The motor vehicle of claim 1, wherein the latch includes a retaining member defining a channel that is adapted to hold a fastener.

6. The motor vehicle of claim 5, wherein the first member includes an aperture through which said fastener extends, the first member including an anchor member such that the fastener fastens together the latch and the anchor member.

7. The motor vehicle of claim 6, wherein the anchor member is a frame member to which the first member is attached.

8. The motor vehicle of claim 6, wherein the aperture includes a protrusion that guides and secures the fastener.

9. The motor vehicle of claim 5, wherein the fastener applies a predetermined force to maintain the latch in the first and second stable position.

10. The motor vehicle of claim 5, wherein the fastener is a resilient ring-shaped member.

11. The motor vehicle of claim 1, wherein the latch initially rolls on the first member and then slides towards the first engageable surface of the base when the latch is pivoted from the first stable position to the second stable position.

12. The motor vehicle of claim 1, wherein the motor vehicle is a snowmobile, the first member is a main body of the snowmobile, and the second member is a cover that provides access to an engine compartment of the snowmobile provided in the main body.

13. The motor vehicle of claim 12, wherein the tab of the latch faces a rear of the snowmobile when the latch is in the second stable position.

14. The motor vehicle of claim 1, wherein the base has a ledge surrounding latch in the second stable position.

15. The motor vehicle of claim 14, wherein the base has a plurality of holes that surround the ledge.

16. A latch mechanism for securing together first and second members, comprising:

a latch provided to the first member, the latch including a foot portion at a proximal end thereof and a tab at a distal end thereof opposite the proximal end, the tab having a first engagement surface and the foot portion having a second engagement surface, the latch being movable between a first stable position in which the tab of the latch extends away from the first member and a second stable position in which the tab extends substantially parallel to the first member; and a base provided to the second member, the base including an aperture sized to receive the tab of the latch, the base including a first engageable surface adjacent a first side of the aperture and a second engageable surface on a second side of the aperture diametrically opposite to the first side, wherein, in order to secure the first member to the second member, the tab of the latch, in its first stable position, is inserted through the aperture of the base, and the latch is moved from the first stable position to the second stable position in which the first engagement surface of the tab engages the first engageable surface of the base and the second engagement surface of the foot portion engages the second engageable surface of the base.

17. The latch mechanism of claim 16, wherein the foot portion of the latch, as seen in transversely to the tab, includes first and second foot portions that engage the first member when the latch is in the first stable position.

18. The latch mechanism of claim 17, wherein the foot portion includes a cam surface that engages the first side of the aperture of the base when the latch moves from the first stable position to the second stable position.

19. The latch mechanism of claim 18, wherein the latch initially rolls on the first member and then the cam surface slides on the first member until the first engagement surface of the latch engages the first engageable surface of the base.

20. The latch mechanism of claim 17, wherein the second engagement surface of the latch is positioned between the first and second foot portions.

21. The latch mechanism of claim 16, wherein the latch includes a retaining member defining a channel that is adapted to hold a fastener.

22. The latch mechanism of claim 21, wherein the first member includes an aperture through which the fastener extends, the first member including an anchor member such that the fastener fastens together the latch and the anchor member.

23. The latch mechanism of claim 22, wherein the anchor is a frame member to which the first member is attached.

24. The latch mechanism of claim 22, wherein the aperture includes a protrusion that guides and secures the fastener.

25. The latch mechanism of claim 21, wherein the fastener applies a predetermined force to maintain the latch in the first and second stable positions.

26. The latch mechanism of claim 21, wherein the fastener is a resilient ring-shaped member.

* * * * *